July 7, 1964 L. H. THOMPSON 3,140,406

APPARATUS FOR DETECTING THE SENSE OF VARIATION OF AN ELECTRICAL POTENTIAL

Original Filed Dec. 24, 1957 2 Sheets-Sheet 1

INVENTOR
LEONARD H. THOMPSON

BY Lester W. Clark
ATTORNEY

United States Patent Office 3,140,406
Patented July 7, 1964

3,140,406

APPARATUS FOR DETECTING THE SENSE OF VARIATION OF AN ELECTRICAL POTENTIAL

Leonard H. Thompson, Poughkeepsie, N.Y., assignor to International Business Machines Corporation, New York, N.Y., a corporation of New York Original application Dec. 24, 1957, Ser. No. 704,915, now Patent No. 3,064,243, dated Nov. 13, 1962. Divided and this application May 4, 1960, Ser. No. 26,848
10 Claims. (Cl. 307—88.5)

This application is a division of my copending application, Serial No. 704,915, filed December 24, 1957, entitled Apparatus for Translating Magnetically Recorded Binary Data, now Patent No. 3,064,243, granted November 13, 1962.

The present invention relates to apparatus for detecting the sense of variation of an electrical potential, and to a differentiating circuit useful in such apparatus. As described in my copending application, the present invention may be used in apparatus for translating magnetically recorded binary data, particularly apparatus for rapidly translating high density data (of the order of 5,000 bits per inch, at a rate of 300 inches per second). In particular, the invention facilitates the reading of such data with reduced signal distortion and reduced interference between adjacent bit cells.

Several systems are in current use for magnetically recording binary data. One such system is known as the biased discrete pulse system. In that system, the background condition of the magnetic record track is a demagnetized condition. The track is divided into unit lengths termed "bit cells." To record a bit, a predetermined portion of a "bit cell" is magnetized with a predetermined polarity, usually to a condition of saturation. Each bit so recorded commonly extends over only one half the length of a bit cell. When reading data so recorded, there are two flux changes to be read for each bit.

Another common system of magnetic recording is known as the NRZI (non-return to zero) system. In that system, a binary "0" is indicated by maintaining the magnetic condition of the track constant at either one of two values throughout one period of the synchronizing frequency, i.e. from the beginning of one synchronizing pulse to the beginning of the next, a period equivalent in terms of track length to the length of one "bit cell." A binary "1" is indicated by shifting the magnetic condition between the two values during one period of the synchronizing frequency. Commonly, the two magnetic values have opposite polarities. This system allows storage of data at higher densities, i.e. the bit cells can be shorter than the biased discrete pulse system, since fewer changes in magnetization are involved.

In any system of magnetically recording binary data, it is desirable to make the bit cell size as small as possible, in order to reduce the size required for the storage unit as a whole. Furthermore, it is desirable to record and read data as rapidly as possible, in order to reduce the overall time requirements of the system.

In any magnetic data recording system, the record is customarily read by running the record track past a reading head which comprises a magnetic circuit having a gap over which the record track is run so as to provide a shunt for the gap whose magnetic quality varies with the record on the track. A magnetic flux of similarly varying quality is thereby induced in the magnetic circuit. A coil encircles a portion of the magnetic circuit and has induced in it by the varying flux an electric potential which varies proportionally to the rate of change of flux. This potential is then translated electrically, by a technique dependent upon the particular recording system used, into binary electric signals corresponding to the recorded data.

Prior systems for reading a magnetic record have typically used the amplitude of the induced electric current as an indication of the presence of a binary "1" or "0" at any given interval.

An object of the present invention is to provide an improved circuit for detecting a reversal in the sense of variation of a varying electrical potential.

Another object is to provide an improved differentiating circuit.

The change in slope of an electrical potential is detected in accordance with the invention by means of a transistor circuit having a capacitor connected in series with the base-emitter impedance of the transistor. An asymmetrically conductive device is connected in parallel with the base-emitter impedance, but is poled oppositely to the base-emitter impedance. The operating signal whose slope is to be detected is applied to the base. If the slope is varying in one sense, the charge on the capacitor is changed in one sense by a current flowing through the transistor and the latter is turned on. If the slope is varying in the opposite sense, the charge on the capacitor is changed in the opposite sense by a current flowing through the parallel asymmetrically conductive device, and the transistor is cut off. In such a circuit, the transistor produces an output signal which is an approximate first derivative of the input signal whenever the slope of the input signal has a particular sign, i.e., either positive or negative.

By making the asymmetrically conductive device a second transistor having complementary symmetry with the first transistor, the second transistor may be made to produce a first derivative output signal for the opposite sign of the slope of the incoming signal. In other words, if the first transistor produces an output signal when the slope of the input signal is positive, then the second transistor produces an output signal when the slope is negative. By proper selection of circuit components, some voltage gain may be obtained in these slope detector circuits.

The output of the transistor or transistors may be amplified or otherwise translated as required by the particular magnetic recording system being used.

When translating data magnetically recorded according to the biased discrete pulse system, a single transistor circuit is employed, and produces output signals coincident with either the leading or trailing edges of the recorded signals.

When translating data magnetically recorded according to the NRZI system, a two transistor circuit is employed, and its outputs are connected to a logic network which produces an output signal whenever the slope of the input signal changes in sign.

Other objects and advantages of the invention will become apparent from a consideration of the following specification and claims, taken together with the accompanying drawings.

Figure 1:
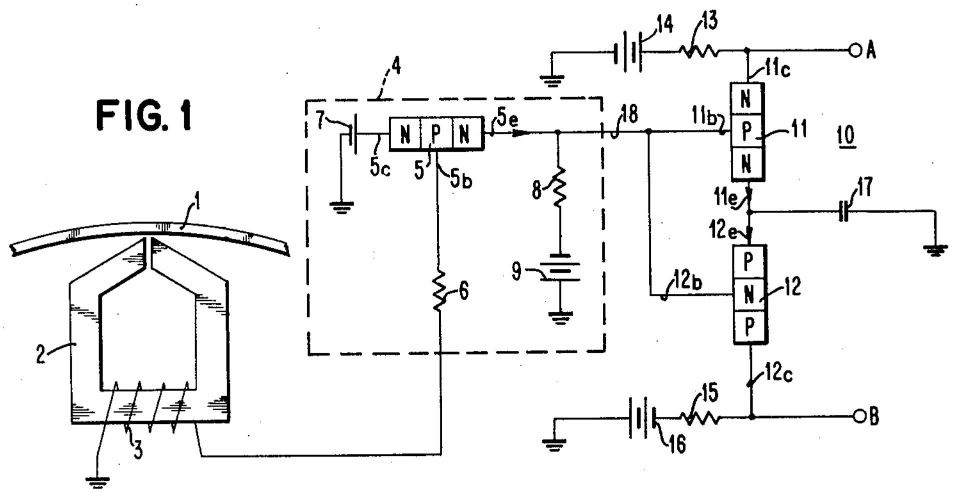
FIG. 1 is a wiring diagram of a data translating apparatus constructed in accordance with the invention.
Figure 2:
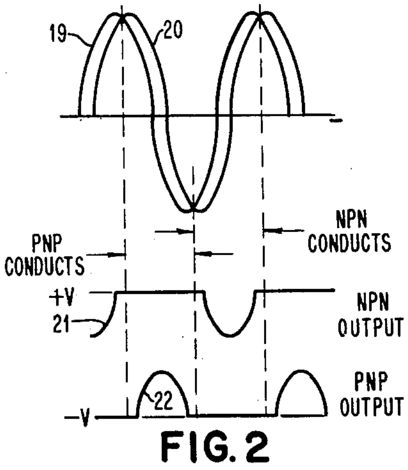
FIG. 2 is a graphical illustration of the variation of certain electrical potentials in the circuit of FIG. 1, when supplied with a sinusoidal input signal.
Figure 3:
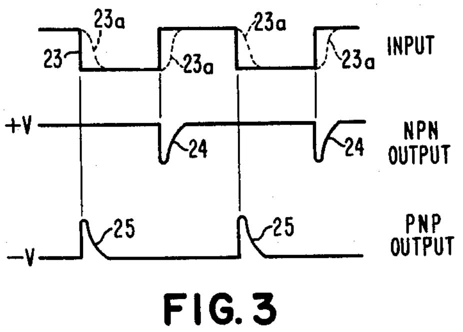
FIG. 3 is a graphical illustration of the variation of certain electrical potentials in the circuit of FIG. 1 when supplied with a square wave input signal.

*FIGS. 1 and 2*

There is shown in these figures a magnetic tape 1 passing over a reading head 2 provided with a coil 3. If the tape 1 has a varying magnetic record on it, then that record induces a varying magnetic flux in the head 2, which produces a correspondingly varying electrical potential in the coil 3. Where the magnetic record is in the form of sharply defined bits, the magnetic flux variation in the head 2 nevertheless is more or less sinusoidal, because the sharp edge of a bit passing across the gap in the reading head does not produce a sharpe change in the flux in the magnetic circuit, but rather a gradual variation. The potential variation in the coil 3 is also more or less sinusoidal. One terminal of coil 3 is connected to ground and the other terminal is connected to an amplifier stage of the emitter-follower type generally indicated by the reference numeral 4. The emitter-follower stages 4, per se, is no part of the present invention, but is described more completely in U.S. Patent No. 2,888,578, issued to George D. Bruce, Robert A. Henle and James L. Walsh on May 26, 1959.

The stage 4 includes an NPN transistor 5 having an emitter electrode 5*e*, a base electrode 5*b*, and a collector electrode 5*c*. Base electrode 5*b* is connected through a resistor 6 to the coil 3. Collector electrode 5*c* is connected through a biasing battery 7 to ground. Emitter electrode 5*e* is connected through a load resistor 8 and a battery 9 to ground.

The emitter-follower stage 4 provides an impedance match and current amplification between the relatively low current, high impedance input (coil 3) and the following slope detector stage 10, which requires substantial input current.

The slope detector stage 10 comprises an NPN transistor 11 and a PNP transistor 12. Transistor 11 has an emitter electrode 11*e*, a base electrode 11*b* and a collector electrode 11*c*. Collector electrode 11*c* is connected through a load resistor 13 and a battery 14 to ground. An output terminal A is also connected to collector 11*c*.

Transistor 12 has an emitter electrode 12*e*, a base electrode 12*b* and a collector electrode 12*c*. Collector electrode 12*c* is connected through a resistor 15 and a battery 16 to ground. Collector electrode 12*c* is also connected to an output terminal B.

The two emitters 11*e* and 12*e* are connected togethei and to one terminal of a capacitor 17, whose opposite terminal is grounded. The base electrodes 11*b* and 12*b* are connected together and to a wire 18, which in turn is connected to the emitter 5*e* of the driver stage 4.

Referring now to FIG. 2, there is shown a sine wave 19 representing an input wave as it appears at the wire 18. When the sign of the input wave is positive, current flows from the wire 18 through base 11*b* and emitter 11*e* and charges the capacitor 17 with its left-hand terminal positive. As long as the potential at wire 18 is positive-going, the base 11*b* has a more positive potential than the emitter 11*e* and the transistor 11 remains conductive. When the potential at wire 18 reverses and starts going negative, it soon becomes more negative than the potential of the emitter 11*e* so that transistor 11 is cut off and collector 11*c* goes to the potential of the positive terminal of battery 14. The potential at the output terminal A is shown at 21 in FIG. 2. The potential at the emitters 11*e* and 12*e* is shown at 20 in FIG. 2.

During the time the curve 19 is more positive than curve 20, the emitter 12*e* is reversely biased with respect to base 12*b* and transistor 12 is cut off. When curve 19 becomes more negative than curve 20, the PNP transistor 12 becomes conductive and is effective to discharge the capacitor 17. If the input signal continues negative-going, the capacitor 17 becomes charged with a potential of polarity such that emitter 12*e* becomes negative with respect to ground. The potential of collector 12*c* then follows the curve 22 of FIG. 2, becoming more positive than the negative terminal of battery 16.

Since the only impedance between wire 18 and the emitters 11*e* and 12*e* is, at any time, only the forward impedance across one junction of a transistor, the potential of the ungrounded terminal of capacitor 17 follows closely the potential at the wire 18, with only a slight delay due to the impedance in the charging circuit. Consequently, the transistors respond rapidly to a change in the sign of the slope of the potential wave at wire 18.

As shown by the curves 21 and 22 in FIG. 2 the signal at the output terminal A shifts away from an Off value of $+V$ when the input signal is positive-going and the signal at output terminal B shifts away from an Off value $-V$ when the input signal is negative-going.

Each half of the circuit of FIG. 1 may be described as a differentiating circuit. The output signal at terminal A is an approximate first derivative of those portions of input signal 19 which have positive slope, and the output signal at terminal B is an approximate first derivative of those portions of input signal 19 which have negative slope.

The accuracy of the derivative is dependent upon the linearity of the base input characteristic of the transistors, and upon the following expression $$A_v \sim \frac{j\omega R_L C}{1+j\omega r_e C}$$

where $A_v$ is the voltage gain, $R_L$ the load resistance, $r_e$ the emitter resistance, C the circuit capacitance, and $\omega=2\pi$ (frequency).

The error term in the above expression is the denominator. By making $r_e$ small as compared to $R_L$, the error may be minimized. Furthermore, the circuit may be made to provide a substantial voltage gain.

The effect of the base input characteristic non-linearity appears chiefly when the derivative of the input signal is in the neighborhood of 0, as when the slope is reversing in sign. Referring to FIG. 2, it may be seen that both outputs are Off simultaneously during such times. That condition is due to the non-linearity of the transistor base input characteristics for very low input signals. Such a condition is referred to below as a "dead spot."

*FIG. 3*

This figure represents the operation of the circuit of FIG. 1 in response to a square wave input signal 23 impressed at the wire 18. The potential at emitters 11*e* and 12*e* follows the input signal, trailing it for a short period after each steep wave front, as shown at 23*a*. The detector stage 10 then produces a signal pulse 24 at output terminal A in response to each positive-going edge of the square wave input signal 23. Similarly, a pulse 25 is produced at output terminal B in synchronism with each negative-going edge of the square wave signal 23.

*FIG. 4*

This figure represents the operation of the read circuit of FIG. 1 in response to a wave produced by a biased discrete pulse recording. The bit period length is indicated by the interval 26 in FIG. 4. The magnetic record is indicated in FIG. 4 by the line 27 showing a series of four sharp-edged bits, each extending over one-half of a bit period.

Figure 4:
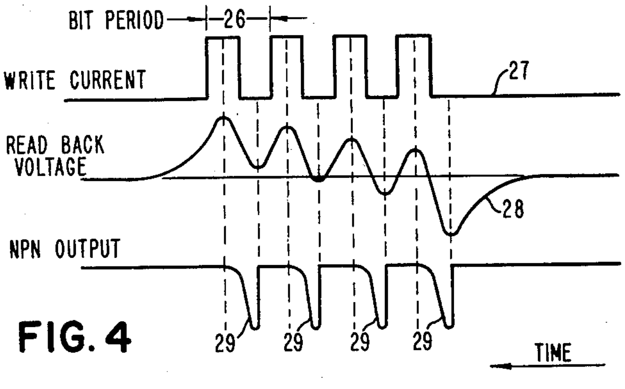
FIG. 4 is a graphical illustration of the variation of certain electrical potentials in the circuit of FIG. 1 when used with the biased discrete pulse recording system.

When the magnetic record 27 is read by a reading head such as shown at 2 in FIG. 1, there is induced in the coil 3 a potential illustrated by the curve 28 of FIG. 4. The curve 28 rounds off the angles of the record 27 so that the variations in the curve 28 are more or less sinusoidal. Furthermore, the absolute values of the potential tend to change over a series of input pulses, as the average potential of the coil changes.

The signal 28, amplified by the stage 4, is transmitted to the slope detector stage 10, which is effective to produce at the output terminal A a series of pulses 29 corresponding to the points along the curve 28 where the slope changes from negative to positive. The output terminal B at the same time produces signals at those times when the slope of the curve 28 changes from positive to negative. However, when reading data is recorded by the biased discrete pulse system, only the output pulses from one terminal are needed.

*FIG. 5*

This figure illustrates a modification of the circuit of FIG. 1 which may be used when translating data recorded according to the biased discrete pulse system. Those elements of this circuit which correspond fully to their counterparts in FIG. 1 have been given the same reference numerals and will not be further described.

Figure 5:
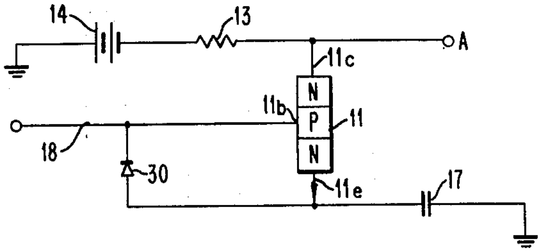
FIG. 5 is a wiring diagram of a modified form of signal translating circuit which may be used with the recording system whose wave forms are illustrated in FIG. 4.

The circuit of FIG. 5 differs from the circuit of FIG. 1 principally in that the transistor 12 and its related circuit elements are replaced by a diode 30 having its anode connected to emitter 11e and its cathode connected to the base electrode 11b.

The circuit of FIG. 5 operates in a manner analogous to the operation of the transistor 11 and its related elements in the circuit of FIG. 1. During those periods of the cycle when the slope of the input signal is negative, the diode 30 is biased in its forward direction. At that time, the base-emitter impedance of transistor 11 is reversely biased, and the transistor is cut off. During those periods when the slope of the input signal is positive, the base-emitter impedance of transistor 11 is forwardly biased and the transistor is On.

Figure 7:
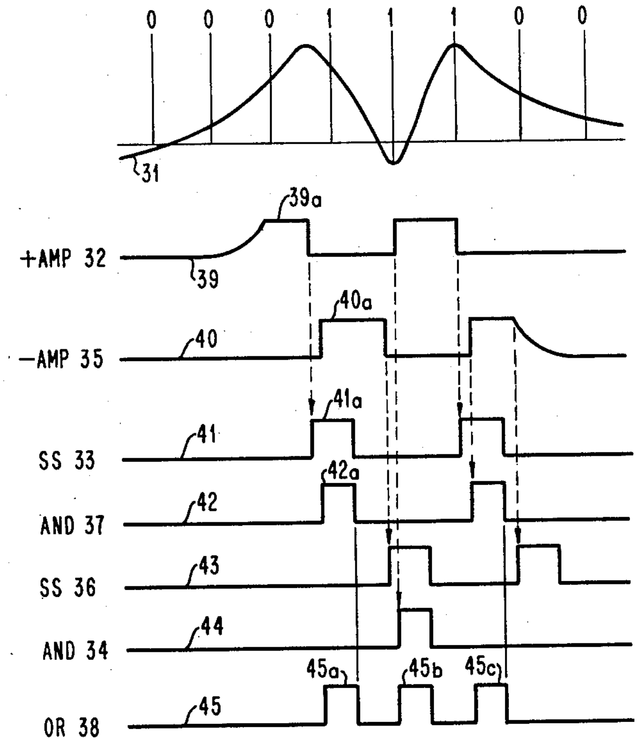
FIG. 7 is a graphical illustration of the variation of certain potentials in the circuit of FIG. 6.
Figure 6:
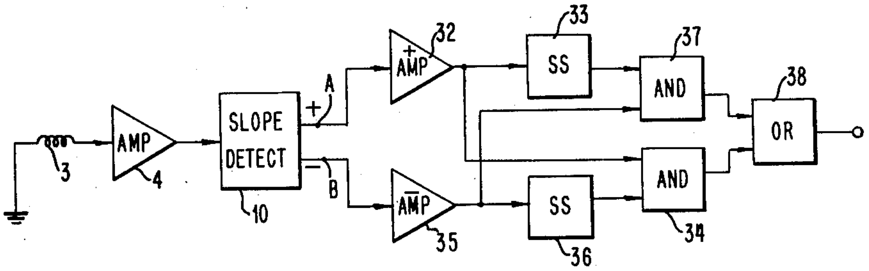
FIG. 6 is a schematic diagram of a translating system utilizing the slope detector circuit of FIG. 1 and intended for use in the NRZI system of recording.

*FIGS. 6 and 7*

These figures illustrate apparatus for translating binary data which has been recorded in accordance with the NRZI system. A series of data, having the binary values indicated in the upper line of FIG. 7, produces in the coil 3 a potential wave having contour illustrated at 31 in FIG. 7. In the slope detector circuit of FIG. 1, when the slope of the input signal reverses, there is a small interval of time or "dead spot" between the cutting off of one of the transistors and the establishment of conduction at the other transistor. This circuit must not produce an output signal in response to an input signal which slopes in one direction, then remains constant, and then slopes again in the same direction. In order to make sure that the circuit produces an output pulse only in response to a shift either from negative to positive slope or from positive to negative slope, the output pulses from the slope detector are stretched to span the "dead spots" and the signals preceding and following each "dead spot" are compared by the circuit shown diagrammatically in FIG. 6.

As there shown, output terminal A of the slope detector stage 10 is connected to an amplifier stage 32 which feeds a single shot bistable circuit 33, and also feeds one input of an AND circuit 34. Similarly output terminal B is connected to an amplifier 35 whose output feeds a single shot bistable circuit 36 and one input of another AND circuit 37. The output of the single shot 33 feeds the other input of AND circuit 37. The output of single shot 36 feeds the other input of AND circuit 34. The respective outputs of the AND circuits 34 and 37 both feed inputs of an OR circuit 38.

Various potentials in the circuit of FIG. 6 are shown graphically in FIG. 7. The curve 39 represents the output potential of the amplifier 32. The curve 40 represents the output potential of amplifier 35. The curve 41 represents the output potential of the single shot 33. The curve 42 represents the output potential of the AND circuit 37. Curve 43 represents the output potential of the single shot 36. Curve 44 represents the output potential of the AND circuit 34. Curve 45 represents output potential of the OR circuit 38.

Referring to FIG. 7, it may be seen that when the positive slope of curve 31 increases beyond a certain value, a signal 39a appears at the output of an amplifier 32 (an amplified signal from output A of slope detector 10). This signal 39a continues until the slope of curve 31 reverses, and then stops. The trailing edge of signal 39a trips the single shot trigger 33, which thereupon produces an output signal 41a which persists for a predetermined time. When the "dead spot" passes, an output signal 40a appears at amplifier 35 as the curve 31 slopes negatively. The simultaneous presence of an output signal 40a at amplifier 35 and signal 41a at single shot 33 trips the AND circuit 37, and it produces a signal 42a which passes through OR circuit 38, appearing in its output as a signal 45a.

The production of output pulses 45b and 45c may be similarly traced.

It may be seen that during the three intervals a binary 1 is recorded, the system produces output pulses from the OR circuit 38. During the other intervals, when binary zeros are recorded, there is no signal from the OR circuit 38. The system therefore translates the binary NRZI data to more conventional electrical binary data of the biased discrete pulse type.

While I have shown and described certain preferred embodiments of my invention, other modifications thereof will readily occur to those skilled in the art, and I, therefore, intend my invention to be limited only by the appended claims.

I claim:

1. Apparatus for detecting the sense of variation of an electrical potential, comprising a transistor having input, output and common electrodes, and impedances between said electrodes, a capacitor, first and second junctions, means including the input and common electrodes connecting the capacitor and the input-common impedance of the transistor in series between said junctions, an asymmetrically conductive device connected in parallel with the input-common impedance and poled oppositely with respect thereto, input means for applying an input signal having an alternating component between said junctions, said input means being effective to send a substantial current through said input-common impedance and turn the transistor on only when the charge on the capacitor is varying in a predetermined sense, and output means connected to the output electrode of the transistor.

2. Apparatus for detecting the sense of variation of a varying electrical potential, comprising a transistor including a body of semi-conductive material having a central region of one conductivity type separated by asymmetrically conductive boundary junctions from two spaced regions of the opposite conductivity type, output circuit means connected between one of said two spaced regions and a common junction and including means to bias reversely the junction between said one region and said central region, a capacitor connected between the other of said two spaced regions and said common junction, asymmetrically conductive means having an anode and a cathode connected directly to said other region and said central region, said asymmetrically conductive means being poled oppositely to the boundary junction between said two last-mentioned regions, and input means for applying said varying electrical potential between said central region and said common junction; said input means, said transistor, and said capacitor cooperating when said potential is varying in one sense to produce a forward current flow through said last-mentioned boundary junction, thereby varying the charge on said capacitor in a corresponding sense and turning the transistor On and when the potential is varying in the opposite sense to bias reversely said last-mentioned boundary junction, thereby turning the transistor Off, said input means and said asymmetrically conductive means then cooperating to vary the charge on said capacitor in the opposite sense by a current flow through said asymmetrically conductive means, and signal output means connected to said output circuit means.

3. Apparatus as defined in claim 2, in which said asymmetrically conductive means is a diode.

4. Apparatus as defined in claim 3, comprising a second transistor having complementary symmetry with said first-mentioned transistor, said asymmetrically conductive means comprising the junction between the central region of said second transistor and one of the two spaced regions thereof, second output circuit means connected to the other spaced region of said second transistor, and second singal output means connected to said second output circuit means, said second transistor being turned Off when said first transistor is On, and vice versa.

5. A differentiating circuit comprising a transistor having a base electrode, an emitter electrode, and a collector electrode, and impedences between said electrodes, input means connected between the base electrode and a common junction, a capacitor connected between the emitter electrode and the common junction, a load circuit connected between the collector electrode and the common junction, output means connected to said load circuit, and asymmetrically conductive means having an anode and a cathode connected directly to the base and emitter electrodes, said asymmetrically conductive means being poled reversely with respect to the base-emitter impedance of the transistor, said transistor being effective only when a signal at the input means is varying in one sense to produce a base-emitter current effective to vary the charge on the capacitor in one sense, and a signal at said output means which is an approximate first derivative of the input signal.

6. A peak detecting circuit comprising; an NPN transistor having a base, an emitter and a collector; means for applying a source of varying voltage to the base; a diode having its cathode connected to the base and its anode connected to the emitter; a condenser connected to the emitter; and means connected between the condenser and the collector for providing a sharp voltage change which corresponds in time to the negative voltage peaks of said varying voltage.

7. A peak detecting circuit comprising; a PNP transistor having a base, an emitter, and a collector, means for applying a source of varying voltage to the base; an asymmetric conductor connecting the base and the emitter, said conductor being connected to present a low impedance to positive voltages applied to said base; electric storage means connected to the emitter; and means connected between said storage means and said collector for providing a sharp voltage change which corresponds in time to the positive voltage peaks of said varying voltage.

8. A peak detecting circuit comprising; an NPN transistor having a collector, means for applying a source of varying voltage to the base, an asymmetric conductor connecting the base and the emitter, said conductor being conneced to present a low impedance to negative voltages applied to said base; electric storage means connected to the emitter; and means connected between said storage means and said collector for providing a sharp voltage change which corresponds in time to the negative voltage peaks of said varying voltage.

9. A peak detecting circuit as set forth in claim 8, in which said asymmetric conducting means is a diode having its cathode connected to the base and its anode connected to the emitter.

10. Apparatus for detecting the sense of variation of an electrical potential, comprising:

(*a*) a transistor having input, output and common electrodes;

(*b*) input means for applying to the input electrode an input signal having an alternating component;

(*c*) a load resistor having one terminal connected to said output electrode and a second terminal;

(*d*) a source of electrical potential connected between the second terminal of the load resistor and a point of reference potential;

(*e*) a capacitor comprising the only direct connection between said common electrode and said point of reference potential;

(*f*) an asymmetrically conductive device connected directly between the input and common electrodes and poled oppositely to the asymmetrical impedance of the transistor between said input and common electrodes;

(*g*) said input means, said transistor and said device cooperating to send a substantial current through the transistor only when the charge on the capacitor is varying in a predetermined sense; and (*h*) an output terminal connected to the output electrode and having a potential varying with the current flow through the transistor.

References Cited in the file of this patent

UNITED STATES PATENTS

| | | |
|---|---|---|
| 2,843,743 | Hamilton | July 15, 1958 |
| 2,880,332 | Wanlass | Mar. 31, 1959 |

FOREIGN PATENTS

| | | |
|---|---|---|
| 1,236,749 | France | June 13, 1960 |